United States Patent
Meiri

(10) Patent No.: US 10,846,178 B2
(45) Date of Patent: Nov. 24, 2020

(54) HASH-BASED REMOTE REBUILD ASSISTANCE FOR CONTENT ADDRESSABLE STORAGE SYSTEMS

(71) Applicant: EMC IP Holding Company LLC, Hopkinton, MA (US)

(72) Inventor: David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 201 days.

(21) Appl. No.: 16/245,746

(22) Filed: Jan. 11, 2019

(65) Prior Publication Data
US 2020/0226023 A1 Jul. 16, 2020

(51) Int. Cl.
| | |
|---|---|
| G06F 11/20 | (2006.01) |
| G06F 11/10 | (2006.01) |
| G06F 11/14 | (2006.01) |
| G06F 16/13 | (2019.01) |
| H04L 29/08 | (2006.01) |
| G06F 16/27 | (2019.01) |

(52) U.S. Cl.
CPC ...... *G06F 11/1092* (2013.01); *G06F 11/1451* (2013.01); *G06F 11/2094* (2013.01); *G06F 16/137* (2019.01); *G06F 16/27* (2019.01); *H04L 67/1097* (2013.01); *H04L 67/2833* (2013.01); *G06F 2211/1028* (2013.01)

(58) Field of Classification Search
CPC .................................................. G06F 11/1092
USPC ............................................... 714/6.24, 6.32
See application file for complete search history.

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Chae M Ko
(74) *Attorney, Agent, or Firm* — Ryan, Mason & Lewis, LLP

(57) ABSTRACT

An apparatus in an illustrative embodiment comprises at least one processing device comprising a processor coupled to a memory. The processing device detects a drive failure in a first storage system comprising a plurality of drives configured in accordance with a designated redundant array of independent disks (RAID) arrangement, identifies a plurality of data pages to be rebuilt in order to recover from the drive failure, retrieves hash digests of respective ones of the identified data pages, and utilizes the hash digests to request respective corresponding data pages from a second storage system. For each of one or more data pages returned by the second storage system, the processing device utilizes the returned data page as a rebuilt data page in recovering from the drive failure so as to avoid reading multiple data pages from remaining ones of the drives of the designated RAID arrangement to rebuild that data page.

20 Claims, 9 Drawing Sheets

(56) References Cited

U.S. PATENT DOCUMENTS

| | | | |
|---|---|---|---|
| 9,606,870 | B1 | 3/2017 | Meiri et al. |
| 9,716,754 | B2 | 7/2017 | Swift |
| 2008/0279462 | A1 | 11/2008 | Celi, Jr. |
| 2009/0132775 | A1* | 5/2009 | Otani ............... G06F 16/113 711/162 |
| 2009/0132955 | A1 | 5/2009 | Garg et al. |
| 2009/0235022 | A1* | 9/2009 | Bates ............... G06F 11/1084 711/114 |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2019/0243733 | A1* | 8/2019 | Romem ............. G06F 11/2082 |
| 2020/0142609 | A1* | 5/2020 | Meiri ................. G06F 3/0679 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

ADDRESS-TO-HASH (A2H) TABLE

| LOGICAL ADDRESS 1 | HASH HANDLE OF DATA PAGE | OTHER FIELDS |
| LOGICAL ADDRESS 2 | HASH HANDLE OF DATA PAGE | OTHER FIELDS |
| ... | | |
| LOGICAL ADDRESS M | HASH HANDLE OF DATA PAGE | OTHER FIELDS |

TABLE KEY

HASH-TO-DATA (H2D) TABLE

| HASH HANDLE 1 | PHYSICAL OFFSET OF DATA PAGE | OTHER FIELDS |
| --- | --- | --- |
| HASH HANDLE 2 | PHYSICAL OFFSET OF DATA PAGE | OTHER FIELDS |
| ... | ... | ... |
| HASH HANDLE D | PHYSICAL OFFSET OF DATA PAGE | OTHER FIELDS |

TABLE KEY

| HASH METADATA (HMD) TABLE | | |
|---|---|---|
| HASH HANDLE 1 | REF COUNT 1 | PHYSICAL OFFSET OF DATA PAGE |
| HASH HANDLE 2 | REF COUNT 2 | PHYSICAL OFFSET OF DATA PAGE |
| ... | ... | ... |
| HASH HANDLE H | REF COUNT H | PHYSICAL OFFSET OF DATA PAGE |

TABLE KEY

| PHYSICAL LAYER BASED (PLB) TABLE | |
|---|---|
| PHYSICAL OFFSET 1 | HASH DIGEST OF DATA PAGE | OTHER FIELDS |
| PHYSICAL OFFSET 2 | HASH DIGEST OF DATA PAGE | OTHER FIELDS |
| ... | ... |
| PHYSICAL OFFSET P | HASH DIGEST OF DATA PAGE | OTHER FIELDS |

TABLE KEY

HASH-BASED REMOTE REBUILD ASSISTANCE FOR CONTENT ADDRESSABLE STORAGE SYSTEMS

FIELD

The field relates generally to information processing systems, and more particularly to storage in information processing systems.

BACKGROUND

Various types of content addressable storage systems are known. Some content addressable storage systems allow data pages of one or more logical storage volumes to be accessed using content-based signatures that are computed from content of respective ones of the data pages. Such content addressable storage system arrangements facilitate implementation of deduplication and compression. For example, the storage system need only maintain a single copy of a given data page even though that same data page may be part of multiple logical storage volumes. Although these and other content addressable storage systems typically provide a high level of storage efficiency through deduplication and compression, problems can arise under certain conditions. For example, a failure occurring in a given storage drive of a content addressable storage system that implements a redundant array of independent disks (RAID) arrangement will typically require a time-consuming and computationally-intensive rebuild process. In addition, the content addressable storage system is operating in a vulnerable state during the rebuild process, as any additional drive failures arising while the rebuild process is underway can cause actual data loss.

SUMMARY

Illustrative embodiments provide techniques for hash-based remote rebuild assistance that facilitate recovery from drive failures in a first storage system. In some embodiments, the first storage system is configured to participate in a replication process with a second storage system, with the first and second storage systems illustratively comprising respective content addressable storage systems. The hash-based remote rebuild assistance techniques can advantageously avoid rebuilding certain data pages of a failed drive by instead using their existing hash digests in the first storage system to recover the corresponding data pages from the second storage system. As a result, such arrangements significantly reduce the amounts of time and computational resources that would otherwise be required in the rebuild process. The hash-based remote rebuild assistance also advantageously reduces the vulnerability of the first storage system to actual data loss by reducing the time required to complete the rebuild process.

In one embodiment, an apparatus comprises at least one processing device comprising a processor coupled to a memory. The processing device is configured to detect a drive failure in a first storage system comprising a plurality of drives configured in accordance with a designated RAID arrangement, to identify a plurality of data pages to be rebuilt in order to recover from the drive failure, to retrieve hash digests of respective ones of the identified data pages, and to utilize the hash digests to request respective corresponding data pages from a second storage system, such as, for example, a second storage system configured to participate in a replication process with the first storage system. Other types of relationships are possible between the first and second storage systems, and replication is not required.

For each of one or more data pages returned by the second storage system, the processing device is further configured to utilize the returned data page as a rebuilt data page in recovering from the drive failure so as to avoid reading multiple data pages from remaining ones of the drives of the designated RAID arrangement to rebuild that data page.

The processing device in some embodiments is implemented in a host device configured to communicate over a network with the first and additional storage systems. In other embodiments, the processing device is implemented in the first storage system. These are only examples, and alternative implementations are possible.

The first storage system in some embodiments comprises a clustered implementation of a content addressable storage system having a distributed storage controller. The content addressable storage system in arrangements of this type is illustratively configured to utilize non-volatile memory storage devices, such as flash-based storage devices. For example, the storage devices of the first storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 4A, 4B, 4C and 4D show examples of logical layer and physical layer mapping tables in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
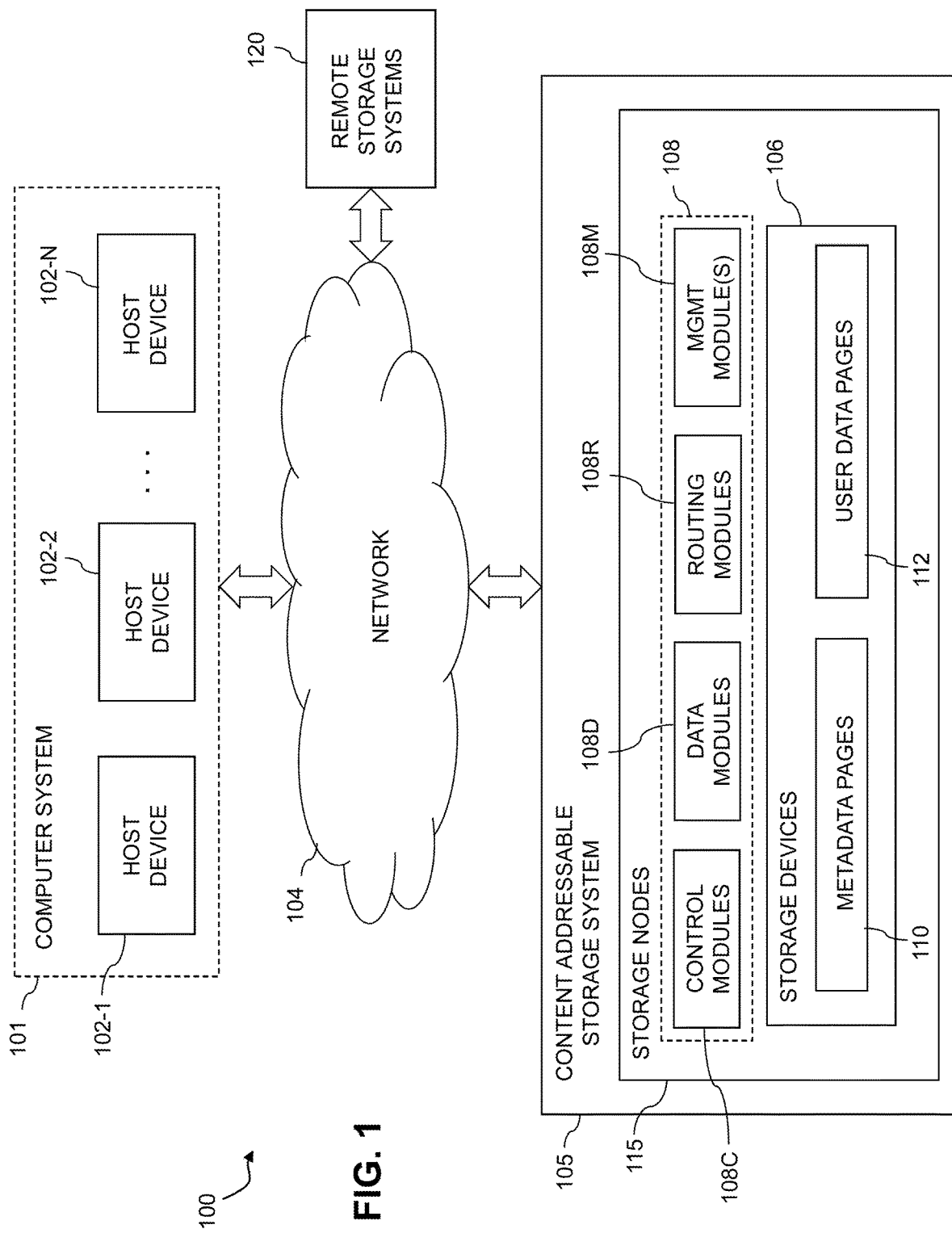
FIG. 1 is a block diagram of an information processing system comprising a content addressable storage system configured to implement hash-based remote rebuild assistance in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate hash-based remote rebuild assistance as disclosed herein. Other types of storage arrays, including by way of example VNX® and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments.

The system 100 further comprises remote storage systems 120 coupled to network 104. A given such remote storage system illustratively comprises another instance of the content addressable storage system 105, or another type of storage system, possibly implemented as a clustered storage system comprising a plurality of nodes. The given remote storage system is an example of what is more generally referred to herein as an "additional storage system" that participates with the content addressable storage system 105 in a hash-based remote rebuild assistance process. It should be noted in this regard that the term "remote" as used herein, in the context of remote storage systems 120 and elsewhere, is intended to be broadly construed, and should not be interpreted as requiring any particular geographic location relationship to the content addressable storage system 105. For example, the given remote storage system can be in a different data center than the content addressable storage system 105, or could alternatively be at a different location within the same physical site. The term "remote" in illustrative embodiments herein can therefore simply indicate that the corresponding storage system is physically separate from the content addressable storage system 105.

Although multiple remote storage systems 120 are shown in the figure, it is to be appreciated that some embodiments may include only a single remote storage system that is utilized for hash-based remote rebuild assistance.

Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

It is assumed in some embodiments that the processing modules of the distributed storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The distributed storage controller 108 of the content addressable storage system 105 in the present embodiment is configured to provide hash-based remote rebuild assistance as disclosed herein. The distributed storage controller 108 is assumed to comprise a type of "processing device" as that term is broadly used herein, and more particularly comprises at least one processor coupled to a memory.

In providing the hash-based remote rebuild assistance, the distributed storage controller 108 in this embodiment is configured to detect a drive failure in the content addressable storage system 105.

It is assumed without limitation that the storage devices 106 of the content addressable storage system 105 comprise a plurality of drives configured in accordance with a designated RAID configuration, such as a RAID-5 arrangement or a RAID-6 arrangement, both of which are well known to those skilled in the art. A RAID-5 arrangement generally permits recovery from a single drive failure utilizing parity information distributed over multiple remaining drives, while a RAID-6 arrangement generally permits recovery from two simultaneous drive failures, also utilizing parity information distributed over multiple remaining drives. Illustrative embodiments are not restricted to use with RAID-5 or RAID-6 arrangements, or to particular types and configurations of parity information that may be used in various implementations of such arrangements.

As mentioned previously, the plurality of drives can comprise, for example, flash drives, solid state drives, hard disk drives, hybrid drives or other types of drives, as well as combinations of different drives of different types. The term "drive" as used herein is therefore intended to be broadly construed.

Also, the term "RAID" as used herein is intended to be broadly construed, and should not be viewed as limited in any way to disk-based drives. As is well known, RAID arrangements can be implemented using a wide variety of different types of storage drives.

The distributed storage controller 108 in this embodiment is further configured to identify a plurality of data pages to be rebuilt in order to recover from the drive failure, to retrieve hash digests of respective ones of the identified data pages, and to utilize the hash digests to request respective corresponding data pages from a second storage system.

The data pages to be rebuilt in order to recover from the drive failure are assumed to be part of one or more storage volumes of the content addressable storage system 105. The term "storage volume" as used herein is intended to encompass at least one logical storage volume comprising at least a portion of a physical storage space of one or more of the storage devices 106 of the content addressable storage system 105.

In some embodiments, the distributed storage controller 108 utilizing the hash digests to request respective corresponding data pages from the second storage system comprises the distributed storage controller 108 sending multiple separate requests each including a different one of the hash digests to the second storage system. As another example, utilizing the hash digests to request respective corresponding data pages from the second storage system illustratively comprises aggregating multiple ones of the hash digests into a single request that is sent to the second storage system. Various combinations of separate and aggregate requests can be used in other embodiments.

The term "request" as used herein is intended to be broadly construed, and a given such request can comprise one or more messages or other types of communications. The request should therefore not be viewed as being limited to a single communication using any particular messaging protocol.

The hash digests of the respective data pages are illustratively generated by the distributed storage controller 108 prior to the drive failure by applying a secure hashing algorithm to content of the respective data pages. More particularly, the hash digest of a given data page can be generated by applying a secure hashing algorithm such as SHA1 to content of the given data page in the content addressable storage system 105. Other types of secure hashing algorithms or hash functions may be used. The hash digests of the respective data pages are assumed to be stored by the content addressable storage system 105 in particular ones of the drives not utilized to store the data pages.

The second storage system is illustratively one of the remote storage systems 120 of the information processing system 100. For example, the second storage system in some embodiments is an additional storage system configured to participate in a replication process with the content addressable storage system 105, and illustratively comprises another instance of content addressable storage system 105. The replication process carried out by these two storage systems illustratively comprises at least one of a synchronous replication process in which one or more storage volumes are synchronously replicated from the content addressable storage system 105 to the second storage system, and an asynchronous replication process in which one or more storage volumes are asynchronously replicated from the content addressable storage system 105 to the second storage system.

Other types of remote storage systems 120 or other additional storage systems not necessarily participating in a replication process with the content addressable storage system 105 can be used. In some embodiments, the information processing system 100 is configured such that the same or similar data is stored in the content addressable storage system 105 and at least one of the remote storage systems 120 without the use of replication. For example, similar copies of a set of files or a database may be stored in the two storage systems by a given one of the host devices 102.

For each of one or more data pages returned by the second storage system, the distributed storage controller 108 utilizes the returned data page as a rebuilt data page in recovering from the drive failure. This advantageously avoids the need for the distributed storage controller 108 to read multiple data pages from remaining ones of the drives of the designated RAID arrangement in order to rebuild that particular returned data page.

The distributed storage controller 108 is further configured to verify a given one of the returned data pages by computing a hash digest of the returned data page and comparing the computed hash digest to the hash digest utilized to request that data page from the second storage system.

The returned data page is considered successfully verified in some embodiments only if there is an exact match between the computed hash digest of the returned data page and the hash digest utilized in the request. Additional or alternative verification criteria can be used in other embodiments.

As indicated above, responsive to a successful verification, the distributed storage controller 108 utilizes the returned data page received from the additional storage system as a rebuilt data page in recovering from the drive failure. The given data page missing as a result of the drive failure is fully recovered by the content addressable storage system 105 using the returned data page, such that there is no need to perform a RAID recovery algorithm and its associated read and parity computation operations for that data page. Any associated metadata structures are updated accordingly.

It is possible that for certain requests sent to the second storage system, the corresponding data page or data pages may not be available in the second storage system. For each of one or more data pages not returned by the second storage system responsive to a request, the distributed storage controller 108 illustratively receives an indication from the second storage system that there is no available data page corresponding to the hash digest in the second storage system. The indications received from the second storage system in some embodiments are in the form of a bitmap indicating which of the hash digests have corresponding data pages available in the second storage system and which of the hash digests do not have corresponding data pages available in the second storage system.

For each of one or more data pages not returned by the second storage system, the distributed storage controller 108 is configured to read multiple data pages from remaining ones of the drives of the designated RAID arrangement and to rebuild that data page in recovering from the drive failure.

Accordingly, in illustrative embodiments, the distributed storage controller 108 responds to a detected drive failure that has resulted in missing data pages by utilizing respective hash digests, typically stored separately from their corresponding data pages, to request the missing data pages from the second storage system. It is expected that many of the requested data pages will be available in the second storage system, particularly if the second storage system is participating in a replication process with the content addressable storage system 105. This advantageously avoids the need to perform a time-consuming and computationally-intensive RAID rebuild process for any of the returned data pages.

For example, absent use of the hash-based remote rebuild assistance functionality disclosed herein, the content addressable storage system 105 in recovering from a drive failure using a RAID-5 or RAID-6 arrangement would typically have to read multiple data pages from remaining ones of the drives, and apply an exclusive-or (XOR) operation in order to recover a given missing data page. As a more particular example, in a 25+1 RAID-5 arrangement with 25 data volumes and one parity volume, suitable for recovering from a single drive failure, each missing page that needs to be rebuilt requires reading 25 pages from 25 different drives and then computing an XOR of the 25 pages. Similarly, in a 29+2 RAID-6 arrangement with 29 data volumes and two parity volumes, suitable for recovering from two simultaneous drive failures, rebuilding a missing data page of a failed drive requires reading 30 pages from 30 different drives and then computing an XOR of the 30 pages.

Illustrative embodiments avoid the need to perform these multiple reads and associated computations for any missing data pages that are requested from and returned by the second storage system utilizing the hash digests. Instead, the returned data page is utilized to provide the missing data page. Although the normal rebuild process may in certain cases be needed for some of the missing pages, this will typically be no more than a relatively small number of the missing pages. As a result, the number of reads and XOR computations and thus the time and complexity of the overall rebuild process is considerably reduced in illustrative embodiments. It was indicated above that conventional approaches would generally require rebuilding every single data page of the failed drive using a time and computation intensive RAID recovery algorithm, such as a RAID XOR algorithm in which multiple data pages are read from respective remaining drives and an XOR of the multiple data pages is computed. Illustrative embodiments provide a significant advance relative to such approaches.

In some embodiments, separate instances of a request containing the hash digest of at least one data page are sent by the content addressable storage system 105 to each of a plurality of additional storage systems. For example, the request may be sent to multiple ones of the remote storage systems 120 that currently participate in replication, migration or management processes with the content addressable storage system 105 or have participated in such a process at some time in the past.

The particular hash-based remote rebuild assistance operations described above are just examples, and additional or alternative operations can be performed in other embodiments.

Also, one or more hash-based remote rebuild assistance operations described above as being performed by the distributed storage controller 108 of the storage system 105 in other embodiments can be performed at least in part by other storage system components under the control of the distributed storage controller 108, or by one of the host devices 102. Also, storage controllers in other embodiments need not be distributed over multiple nodes, but can instead be fully contained within a given node or other type of processing device.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The functionality for hash-based remote rebuild assistance in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include hash-based remote rebuild assistance control logic that engages or otherwise interacts with corresponding control logic instances in at least a subset of the control modules 108C, data modules 108D and routing modules 108R in order to implement hash-based remote rebuild assistance functionality in the content addressable storage system 105.

In some embodiments, the content addressable storage system 105 comprises an XtremIO™ storage array suitably modified to incorporate techniques for hash-based remote rebuild assistance as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for hash-based remote rebuild assistance in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more IO operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices 102 identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 105. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments will be described below in conjunction with FIGS. 4A through 4D. These particular examples include respective A2H, H2D, HMD and physical layer based ("PLB") tables. In some embodiments, the A2H and H2D tables are utilized primarily by the control modules 108C, while the HMD and PLB tables are utilized primarily by the data modules 108D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 105. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the content addressable storage system 105 correspond to respective physical blocks of a physical layer of the content addressable storage system 105. The user data pages of the logical layer are organized by LBA and have reference via respective content-based signatures to particular physical blocks of the physical layer.

Each of the physical blocks has an associated reference count that is maintained within the content addressable storage system 105. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for hash-based remote rebuild assistance in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least a one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controller 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for hash-based remote rebuild assistance as disclosed herein can be implemented in a host device, in a storage system, or partially in a host device and partially in a storage system.

Illustrative embodiments are therefore not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
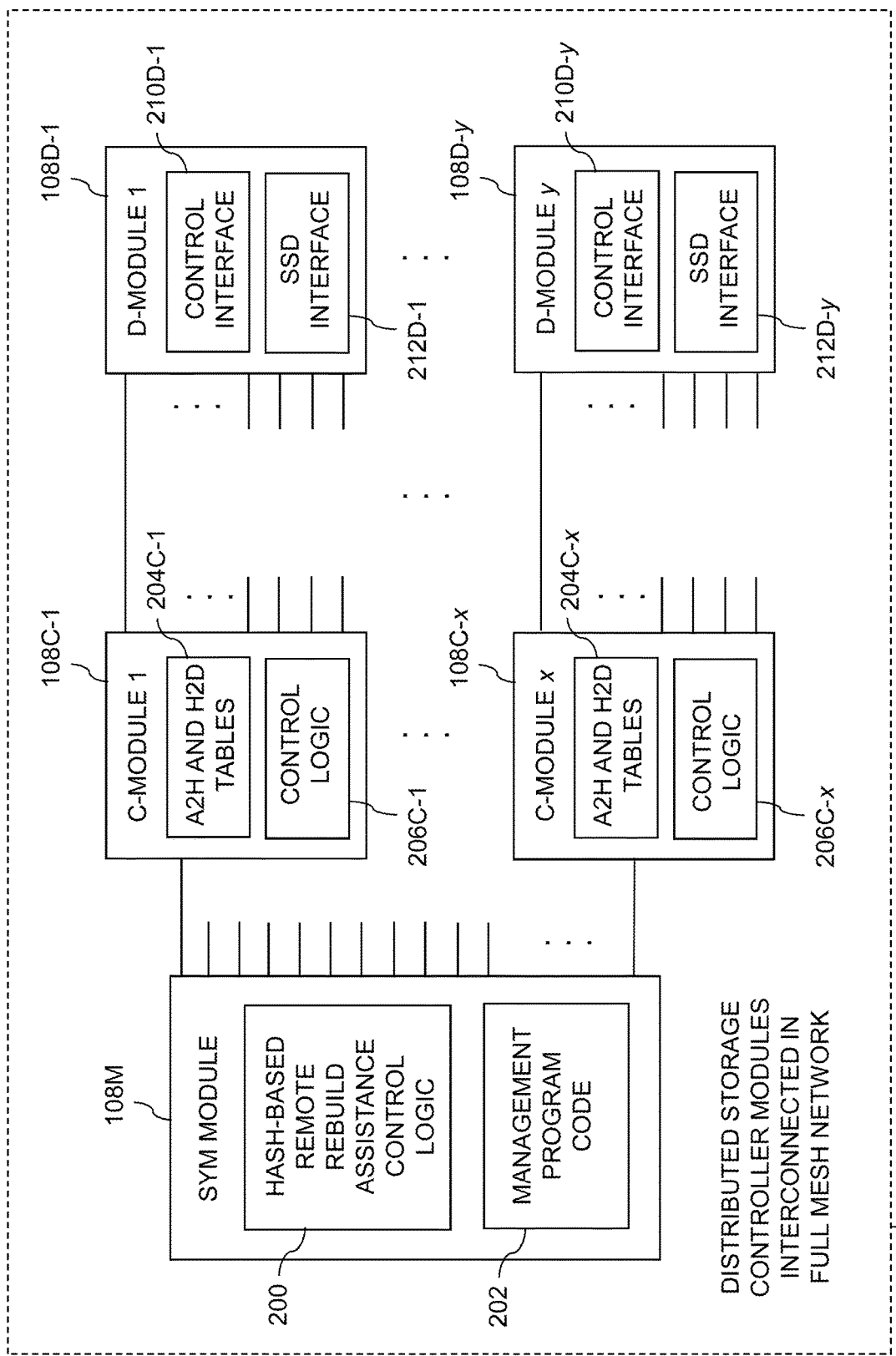
FIG. 2 illustrates a portion of a distributed storage controller of a content addressable storage system showing one possible arrangement utilizing control modules and data modules interconnected by a mesh network and configured to implement hash-based remote rebuild assistance in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises hash-based remote rebuild assistance control logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of A2H and H2D tables 204C-1 through 204C-x. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein. The control modules 108C-1 through 108C-x further comprise corresponding instances of hash-based remote rebuild assistance control logic 206C-1 through 206C-x that interact with the hash-based remote rebuild assistance control logic 200 of the management module 108M to support hash-based remote rebuild assistance as disclosed herein.

The control modules 108C may further comprise additional components not explicitly shown in FIG. 2, such as respective messaging interfaces that are utilized by the control modules 108 to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106.

Figure 3:
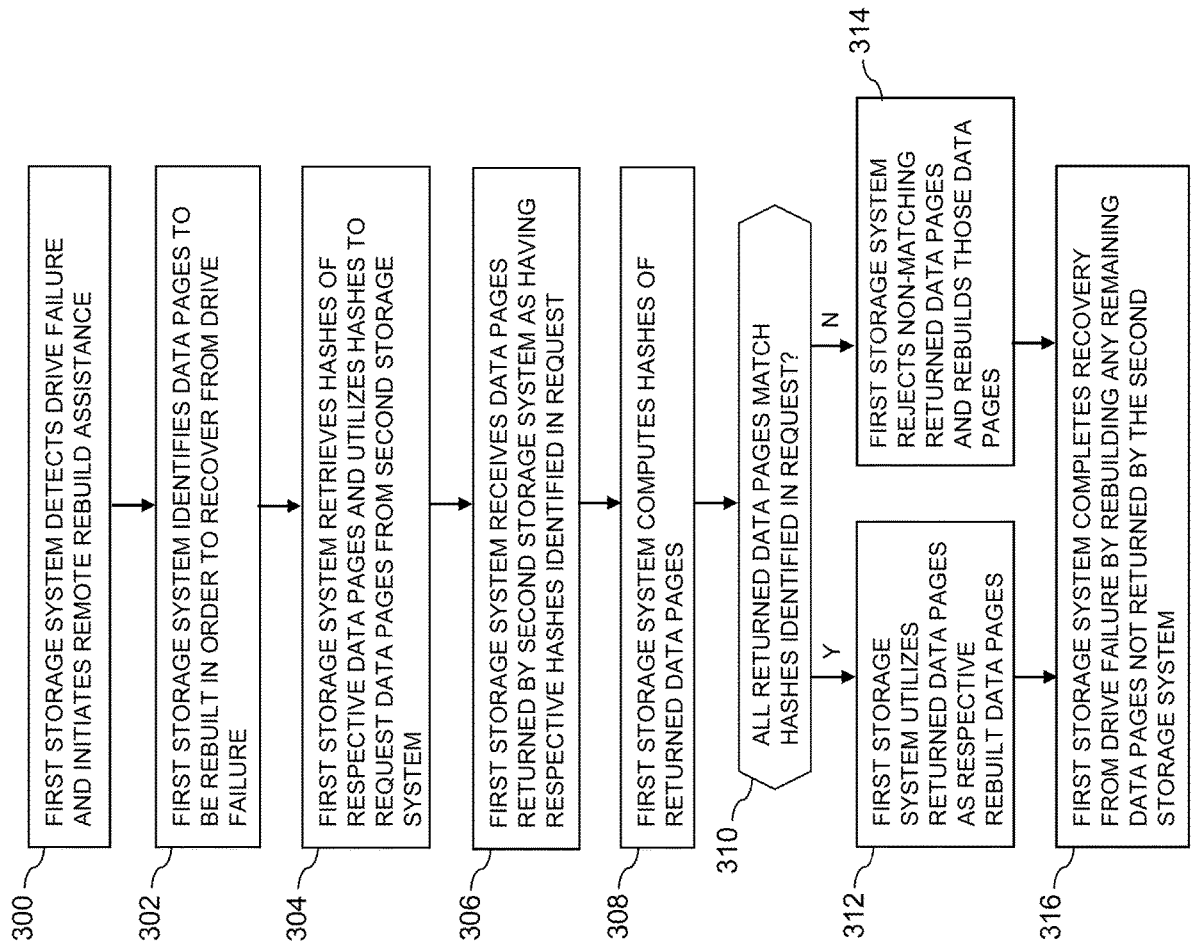
FIG. 3 is a flow diagram showing a process for implementing hash-based remote rebuild assistance in an illustrative embodiment.

The operation of the information processing system 100 will now be described in further detail with reference to the flow diagram of FIG. 3. The flow diagram of FIG. 3 illustrates a set of processing operations implementing functionality for hash-based remote rebuild assistance in a content addressable storage system. The process includes steps 300 through 316, and is suitable for use in system 100 but is more generally applicable to other types of storage systems in which it is desirable to provide hash-based remote rebuild assistance in a given storage system from one or more remote storage systems. The steps of the flow diagram are illustratively performed at least in part by or otherwise under the control of a storage controller of a first storage system, such as the distributed storage controller 108 of content addressable storage system 105, through interaction with an additional storage system, referred to as a second storage system. The first and second storage systems in the FIG. 3 embodiment are assumed to comprise respective content addressable storage systems that participate in a replication process, such as a synchronous or asynchronous replication process. The first and second storage systems can comprise respective first and second storage arrays, such as respective all-flash storage arrays implemented using sets of distributed storage nodes.

In step 300, the first storage system detects a drive failure and initiates hash-based remote rebuild assistance in order to recover from the drive failure in a particularly efficient manner that avoids using a RAID XOR algorithm or other type of RAID recovery algorithm to rebuild at least a portion of the data pages stored on the failed drive.

Such drive failure detection can be performed at least in part by a management module or other processing module of a distributed storage controller in a clustered storage system, such as one or more of the control modules 108C, data modules 108D and/or management module(s) 108M of distributed storage controller 108 in the content addressable storage system 105, although other types of storage system modules or components can perform drive failure detection of the type disclosed herein.

In step 302, the first storage system identifies data pages to be rebuilt in order to recover from the drive failure. Such data pages illustratively comprise all of the user data pages that were stored on the failed drive. These data pages are also referred to herein as "missing" data pages that need to be recovered.

In step 304, the first storage system retrieves hashes of respective ones of the identified data pages and utilizes the retrieved hashes to request corresponding data pages from the second storage system. It is assumed in the present embodiment that "hashes" refer to full hash digests of the respective pages, although other arrangements are possible. The hashes are typically stored separately from the data pages in a content addressable storage system, and are therefore likely to remain available despite the drive failure.

The request referred to in step 304 can comprise a separate request for each of the missing data pages, or one or more requests each of which aggregates hashes for multiple ones of the missing data pages.

As an example of one possible implementation of a separate request for each missing data page, the first storage system can proceed as follows:

1. Identify all missing data pages.
2. For each missing data page, retrieve its hash digest and send a separate read request to the second storage system for the data page corresponding to this hash digest. If the hash digest exists in the second storage system, the second storage system returns the corresponding data page, and otherwise returns an indication that the hash digest in the request is not recognized by the second storage system.
3. Repeat step 2 until all of the missing data pages are either returned or indicated as not recognized by the second storage system.

As an example of one possible implementation of a request that aggregates hashes for multiple ones of the missing data pages, the first storage system can combine multiple hash digests into a single read request that is directed to the second storage system. The second storage system can then respond with a bitmap indicating which of the hash digests were recognized, while also returning the corresponding data pages.

It is assumed for the description of the FIG. 3 process that the requests for missing data pages are sent from the first storage system only to the second storage system, although the requests could be sent to multiple additional storage systems in other embodiments and the processing operations adjusted accordingly.

As indicated previously, the term "request" as used herein is intended to be broadly construed and in some embodiments may comprise a combination of several separate communications each containing different types of information. For example, a request can comprise a first communication that includes a given remote rebuild assistance command and a second separate communication that contains the hash digest of the corresponding data page to which the remote rebuild assistance request applies. Numerous other multi-part or single part requests are possible.

These particular request arrangements are examples only, and other types of requests can be used in other embodiments.

In response to receipt of a hash digest in a given request from the first storage system, the second storage system attempts to locate a matching hash digest. For example, in some embodiments the second storage system attempts to locate a matching hash digest in a PLB table that it maintains. If a matching hash digest is found, the second storage system retrieves the corresponding data page and returns it to the first storage system as a returned data page responsive to the request.

If a matching hash digest is not found by the second storage system, the second storage system provides an appropriate indication back to the first storage system that the corresponding data page is not available in the second storage system. In such situations, although not explicitly illustrated in the figure, one or more additional requests could then be generated and sent by the first storage system to other remote storage systems in a further attempt to locate the missing data page not found in the second storage system.

In step 306, the first storage system receives data pages returned by the second storage system as having respective ones of the hashes identified in one or more requests. As it is assumed in the present embodiment that the first and second storage systems participate in a replication process, it is highly likely that the data pages missing from the first storage system due to the drive failure are available in the second storage system. Accordingly, it is expected that all or most of the requested data pages are returned by the second storage system to the first storage system responsive to the request.

In step 308, the first storage system computes hashes of the returned data pages. For example, the hash digest of a given returned data page is illustratively computed by applying a secure hashing algorithm such as SHA1 to content of the returned data page. Other types of hash functions can be used to generate hash digests herein.

In step 310, a determination is made by the first storage system as to whether or not the computed hashes of the returned data pages match the hashes identified in the request. If the computed hashes for all returned data pages match their respective hashes identified in the request, the process moves to step 312, and otherwise moves to step 314 as shown.

In step 312, the first storage system utilizes the returned data pages as respective rebuilt data pages in recovering from the drive failure. Such an arrangement advantageously avoids the need to perform a RAID XOR algorithm or other type of RAID recovery algorithm to rebuild those data pages. This significantly improves the efficiency of the overall rebuild process for the missing data pages.

For example, for each missing data page that is retrieved from the second storage system instead of being rebuilt by the first storage system using a RAID XOR algorithm, a time and computation intensive part of the rebuild process (e.g., reads of multiple data pages from respective remaining drives, an XOR of the multiple data pages, and a write of the rebuilt data page) with a much more efficient arrangement (e.g., read hash in first storage system, read data page from second storage system, write returned data page).

In step 314, the first storage system rejects any non-matching returned data pages and rebuilds those data pages in accordance with the RAID XOR algorithm or other RAID recovery algorithm.

In step 316, the first storage system completes the recovery from the drive failure by rebuilding any remaining data pages not returned by the second storage system. As noted above, it is expected that all or most of the requested missing data pages are returned by the second storage system to the first storage system, as the first and second storage systems are illustratively configured to participate in a replication process. Accordingly, in some cases there may be no data pages remaining to be rebuilt in step 316.

The particular processing operations and other system functionality described above in conjunction with the flow diagram of FIG. 3 are presented by way of illustrative example only, and should not be construed as limiting the scope of the disclosure in any way. Alternative embodiments can use other types of processing operations for implementing hash-based remote rebuild assistance in a content addressable storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to support multiple instances of hash-based remote rebuild assistance for different drive failures within a given storage system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the process of the flow diagram of FIG. 3 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

As mentioned previously, the FIG. 3 process and other illustrative embodiments herein utilizing mapping tables or other metadata structures in implementing hash-based remote rebuild assistance.

Examples of metadata structures maintained by the first and second storage systems in illustrative embodiments include the A2H, H2D, HMD and PLB tables shown in respective FIGS. 4A, 4B, 4C and 4D. It is to be appreciated that these particular tables are only examples, and other tables or metadata structures having different configurations of entries and fields can be used in other embodiments.

Referring initially to FIG. 4A, an A2H table 400 is shown. The A2H table 400 comprises a plurality of entries accessible utilizing logical addresses denoted Logical Address 1, Logical Address 2, . . . Logical Address M as respective keys, with each such entry of the A2H table 400 comprising a corresponding one of the logical addresses, a corresponding one of the hash handles, and possibly one or more additional fields.

FIG. 4B shows an H2D table 402 that illustratively comprises a plurality of entries accessible utilizing hash handles denoted Hash Handle 1, Hash Handle 2, . . . Hash Handle D as respective keys, with each such entry of the H2D table 402 comprising a corresponding one of the hash handles, a physical offset of a corresponding one of the data pages, and possibly one or more additional fields.

Referring now to FIG. 4C, an HMD table 404 comprises a plurality of entries accessible utilizing hash handles denoted Hash Handle 1, Hash Handle 2, . . . Hash Handle H as respective keys. Each such entry of the HMD table 404 comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. Although not explicitly so indicated in the figure, the HMD table 404 may also include one or more additional fields.

FIG. 4D shows a PLB table 406 that illustratively comprises a plurality of entries accessible utilizing physical offsets denoted Physical Offset 1, Physical Offset 2, . . . Physical Offset P as respective keys, with each such entry of the PLB table 406 comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Also, it is to be appreciated that terms such as "table" and "entry" as used herein are intended to be broadly construed, and the particular example table and entry arrangements of FIGS. 4A through 4D can be varied in other embodiments. For example, additional or alternative arrangements of entries can be used.

Illustrative embodiments of storage systems with hash-based remote rebuild assistance from one or more other storage systems as disclosed herein can provide a number of significant advantages relative to conventional arrangements.

For example, some embodiments provide content addressable storage systems and other types of clustered storage systems that can quickly recover from drive failures by avoiding the need to perform a time and computation intensive RAID recovery algorithm for at least a subset of the data pages of the failed storage drive.

Accordingly, illustrative embodiments avoid the need to utilize the RAID recovery algorithm to rebuild every single data page that is missing due to the drive failure. Such arrangements significantly reduce the amounts of time and computational resources that would otherwise be required in the rebuild process.

Hash-based remote rebuild assistance as disclosed herein therefore also advantageously reduces the vulnerability of the storage system to actual data loss by reducing the time required to complete the rebuild process.

Furthermore, illustrative embodiments avoid the need to obtain full copies of one or more storage volumes impacted by the drive failure from a remote storage system.

These and other embodiments can obtain returned data pages from one or more additional storage systems over any of a wide variety of communication links. For example, returned data pages can be obtained by a given storage system from other storage systems that participate with the given storage system in various replication, migration or management processes. It is possible for the given storage system to receive returned data pages in such embodiments even if the replication, migration or management processes are no longer active but had occurred at some point in the past.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement hash-based remote rebuild assistance functionality will now be described in greater detail with reference to FIGS. 5 and 6. Although described in the context of system 100, these platforms may also be used to implement at least portions of other information processing systems in other embodiments.

Figure 5:
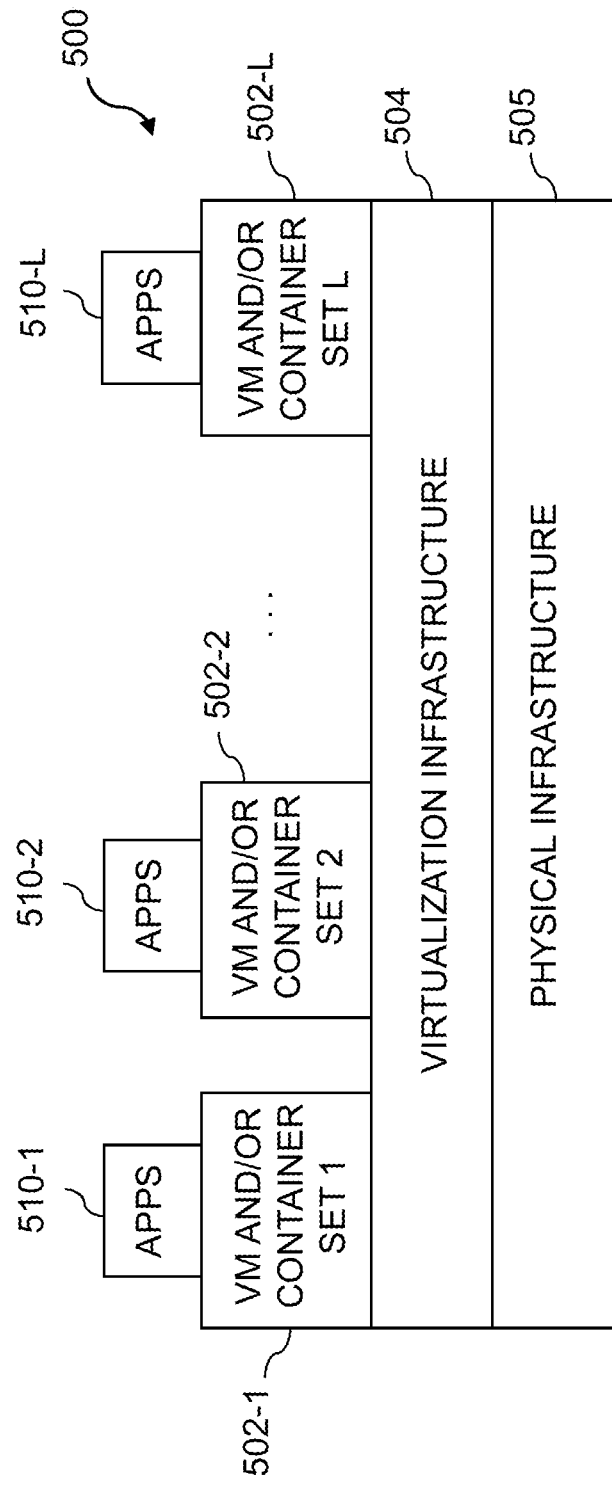
FIGS. 5 and 6 show examples of processing platforms that may be utilized to implement at least a portion of an information processing system in illustrative embodiments.
Figure 6:
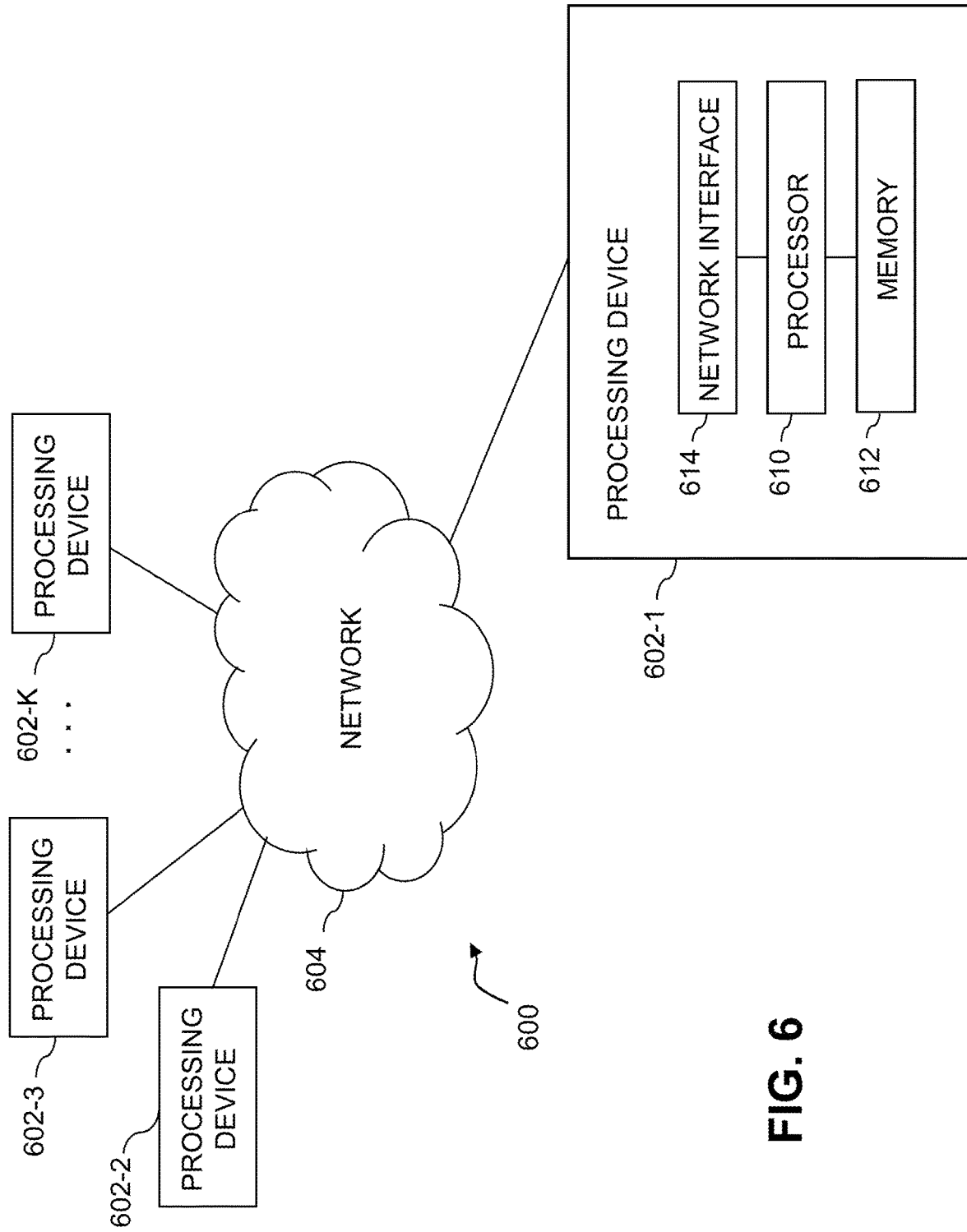

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide storage functionality of the type described above for one or more processes running on a given one of the VMs. For example, the given VM can implement one or more instances of the FIG. 3 process for hash-based remote rebuild assistance.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the FIG. 3 process for hash-based remote rebuild assistance.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, hash-based remote rebuild assistance processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the processing device being configured:
to detect a drive failure in a first storage system comprising a plurality of drives configured in accordance with a designated redundant array of independent disks (RAID) arrangement;
to identify a plurality of data pages to be rebuilt in order to recover from the drive failure;
to retrieve hash digests of respective ones of the identified data pages;
to utilize the hash digests to request respective corresponding data pages from a second storage system; and
for each of one or more data pages returned by the second storage system, to utilize the returned data page as a rebuilt data page in recovering from the drive failure so as to avoid reading multiple data pages from remaining ones of the drives of the designated RAID arrangement to rebuild that data page.

2. The apparatus of claim 1 wherein the processing device is implemented at least in part in a host device configured to communicate over a network with the first and additional storage systems.

3. The apparatus of claim 1 wherein the processing device is implemented at least in part in the first storage system.

4. The apparatus of claim 1 wherein the hash digests of the respective data pages are generated by the first storage system prior to the drive failure by applying a secure hashing algorithm to content of the respective data pages.

5. The apparatus of claim 1 wherein the hash digests of the respective data pages are stored by the first storage system in particular ones of the drives not utilized to store the data pages.

6. The apparatus of claim 1 wherein the processing device is further configured to verify a given one of the returned data pages by computing a hash digest of the returned data page and comparing the computed hash digest to the hash digest utilized to request that data page from the second storage system.

7. The apparatus of claim 1 wherein the designated RAID arrangement comprises one of a RAID-5 arrangement and a RAID-6 arrangement.

8. The apparatus of claim 1 wherein utilizing the hash digests to request respective corresponding data pages from a second storage system comprises sending a plurality of separate requests each including a different one of the hash digests to the second storage system.

9. The apparatus of claim 1 wherein utilizing the hash digests to request respective corresponding data pages from a second storage system comprises aggregating multiple ones of the hash digests into a single request that is sent to the second storage system.

10. The apparatus of claim 1 wherein the processing device is further configured, for each of one or more data pages not returned by the second storage system, to receive an indication from the second storage system that there is no available data page corresponding to the hash digest in the second storage system.

11. The apparatus of claim 10 wherein receiving the indications from the second storage system comprises receiving a bitmap indicating which of the hash digests have corresponding data pages available in the second storage system and which of the hash digests do not have corresponding data pages available in the second storage system.

12. The apparatus of claim 1 wherein the processing device is further configured, for each of one or more data pages not returned by the second storage system, to read multiple data pages from remaining ones of the drives of the designated RAID arrangement to rebuild that data page in recovering from the drive failure.

13. The apparatus of claim 1 wherein the first storage system is configured to participate in a replication process with the second storage system, the replication process comprising at least one of:
a synchronous replication process in which one or more storage volumes are synchronously replicated from the first storage system to the second storage system; and
an asynchronous replication process in which one or more storage volumes are asynchronously replicated from the first storage system to the second storage system.

14. The apparatus of claim 13 wherein the storage volume comprises at least one logical storage volume comprising at least a portion of a physical storage space of one or more of the drives of the first storage system.

15. A method comprising:
detecting a drive failure in a first storage system comprising a plurality of drives configured in accordance with a designated redundant array of independent disks (RAID) arrangement;
identifying a plurality of data pages to be rebuilt in order to recover from the drive failure;
retrieving hash digests of respective ones of the identified data pages;
utilizing the hash digests to request respective corresponding data pages from a second storage system; and
for each of one or more data pages returned by the second storage system, utilizing the returned data page as a rebuilt data page in recovering from the drive failure so as to avoid reading multiple data pages from remaining ones of the drives of the designated RAID arrangement to rebuild that data page;
wherein the method is implemented by at least one processing device comprising a processor coupled to a memory.

16. The method of claim 15 further comprising verifying a given one of the returned data pages by computing a hash digest of the returned data page and comparing the computed hash digest to the hash digest utilized to request that data page from the second storage system.

17. The method of claim 15 wherein utilizing the hash digests to request respective corresponding data pages from a second storage system comprises aggregating multiple ones of the hash digests into a single request that is sent to the second storage system.

18. A computer program product comprising a non-transitory processor-readable storage medium having stored therein program code of one or more software programs, wherein the program code when executed by at least one processing device causes said at least one processing device:
to detect a drive failure in a first storage system comprising a plurality of drives configured in accordance with a designated redundant array of independent disks (RAID) arrangement;
to identify a plurality of data pages to be rebuilt in order to recover from the drive failure;
to retrieve hash digests of respective ones of the identified data pages;
to utilize the hash digests to request respective corresponding data pages from a second storage system; and
for each of one or more data pages returned by the second storage system, to utilize the returned data page as a rebuilt data page in recovering from the drive failure so as to avoid reading multiple data pages from remaining ones of the drives of the designated RAID arrangement to rebuild that data page.

19. The computer program product of claim 18 wherein the program code when executed further causes said at least one processing device to verify a given one of the returned data pages by computing a hash digest of the returned data page and comparing the computed hash digest to the hash digest utilized to request that data page from the second storage system.

20. The computer program product of claim 18 wherein utilizing the hash digests to request respective corresponding data pages from a second storage system comprises aggregating multiple ones of the hash digests into a single request that is sent to the second storage system.

* * * * *